United States Patent [19]

Bechu et al.

[11] Patent Number: 4,749,216
[45] Date of Patent: Jun. 7, 1988

[54] DEVICE FOR ANCHORING A FLEXIBLE TUBULAR SYSTEM ON A RIGID SHOULDER BY MEANS OF A FRAGMENTED ARMATURE

[75] Inventors: Jean-Pierre Bechu, Courbevoie; Bernard Daignot; Claude Roux, both of Decize, all of France

[73] Assignee: Caoutchouc Manufacture et Plastiques, Bezons, France

[21] Appl. No.: 851,733

[22] Filed: Apr. 14, 1986

[30] Foreign Application Priority Data

Apr. 12, 1985 [FR] France ............................. 85 05505

[51] Int. Cl.⁴ ............................................. F16L 51/02
[52] U.S. Cl. ..................................... 285/229; 285/423
[58] Field of Search ............... 285/200, 226, 229, 208, 285/423; 277/192, 195, 199

[56] References Cited

U.S. PATENT DOCUMENTS

| | | | |
|---|---|---|---|
| 1,440,814 | 1/1923 | Bins | 285/423 |
| 1,851,758 | 3/1932 | Eger. | |
| 2,285,319 | 6/1942 | Wheeler | 277/192 |
| 2,298,736 | 10/1942 | Harpfer | 285/368 |
| 2,350,655 | 6/1944 | Wheeler | 277/192 |
| 2,692,782 | 10/1954 | Jones. | |
| 2,879,804 | 3/1959 | Hammond | 285/229 |
| 2,998,986 | 9/1961 | Buono | 285/229 |
| 3,528,687 | 9/1970 | Underwood | 285/200 |
| 3,837,178 | 9/1974 | Hackforth et al. | 285/200 |
| 4,014,569 | 3/1977 | Thorp et al. | 285/423 |
| 4,155,573 | 5/1979 | Ehlers | 285/229 |
| 4,241,944 | 12/1980 | Clark | 285/229 |
| 4,398,725 | 8/1983 | Maegawa | 277/192 |
| 4,536,018 | 8/1985 | Patarcity | 285/229 |

FOREIGN PATENT DOCUMENTS

| | | |
|---|---|---|
| 1273930 | 7/1968 | Fed. Rep. of Germany. |
| 2055898 | 5/1972 | Fed. Rep. of Germany. |
| 2606180 | 8/1977 | Fed. Rep. of Germany. |
| 2914375 | 10/1980 | Fed. Rep. of Germany. |
| 2006730 | 1/1970 | France. |
| 2033789 | 12/1970 | France. |
| 2127561 | 10/1972 | France. |
| 2232239 | 12/1974 | France. |
| 2280853 | 2/1976 | France. |
| 2447512 | 8/1980 | France. |

OTHER PUBLICATIONS

Performer AD 10 pipe catalog, p. 4.
Dilatoflex K catalog FC 175-18, Jun. 1984.
General Rubber Corporation catalog 88 and 683.
Stenflex catalog No. 2, Jun. 1984.
Dilatoflex "NT" Technical Paper, 79-B, A1-A4, G, 3rd Ed., Oct. 1981.

Primary Examiner—Randolph A. Reese
Assistant Examiner—Anthony Knight
Attorney, Agent, or Firm—Antonelli, Terry & Wands

[57] ABSTRACT

Radial device for anchoring a flexible tubular structure in an opening in a rigid wall, characterized by flexible tubular structure having a bead reinforced by a fragmented armature embedded in rubber, composed of individual elements in order to allow bead to bend in the axial direction so that it can slide into a bore of the rigid wall.

The invention applies to any industrial assembly, such as for example, expansion joints, or any assembly on a vehicle, such as air suspension diaphragms.

11 Claims, 5 Drawing Sheets

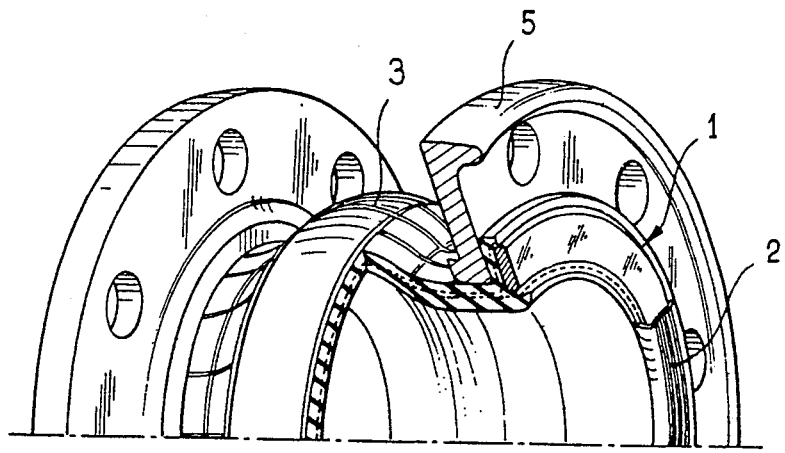
FIG_1a PRIOR ART
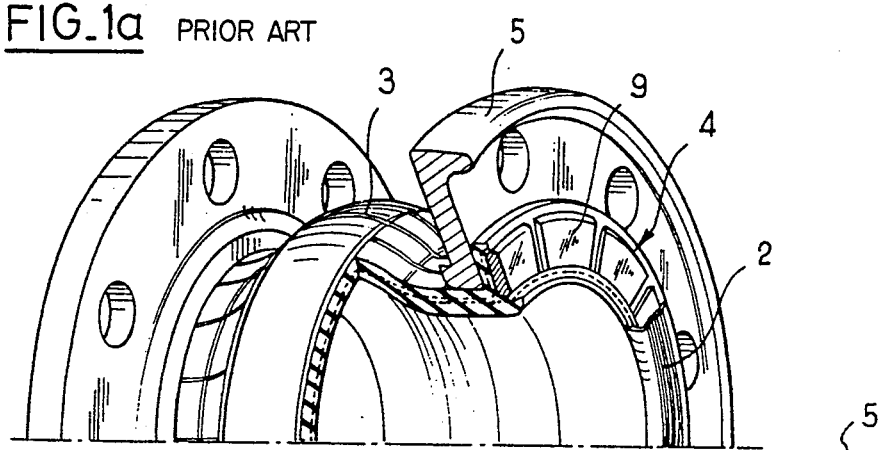
FIG_1b
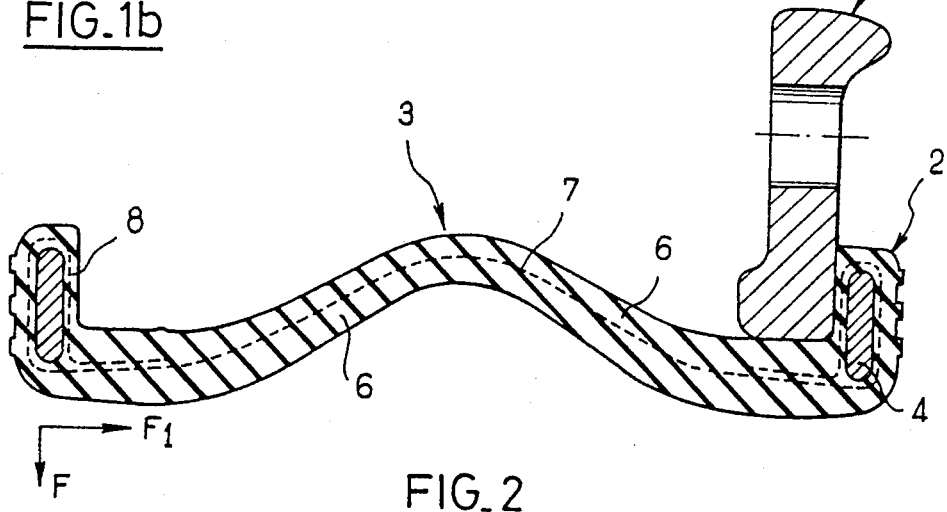
FIG_2

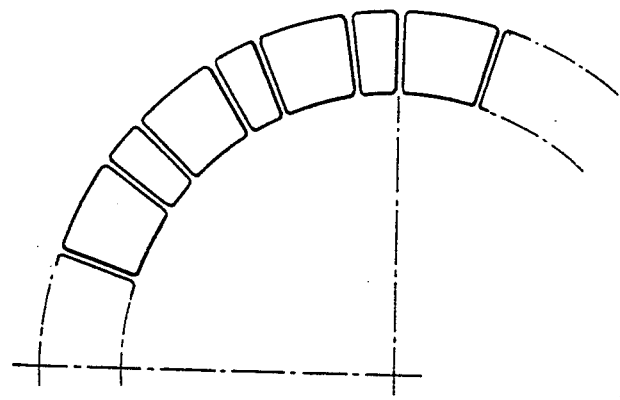
FIG_5
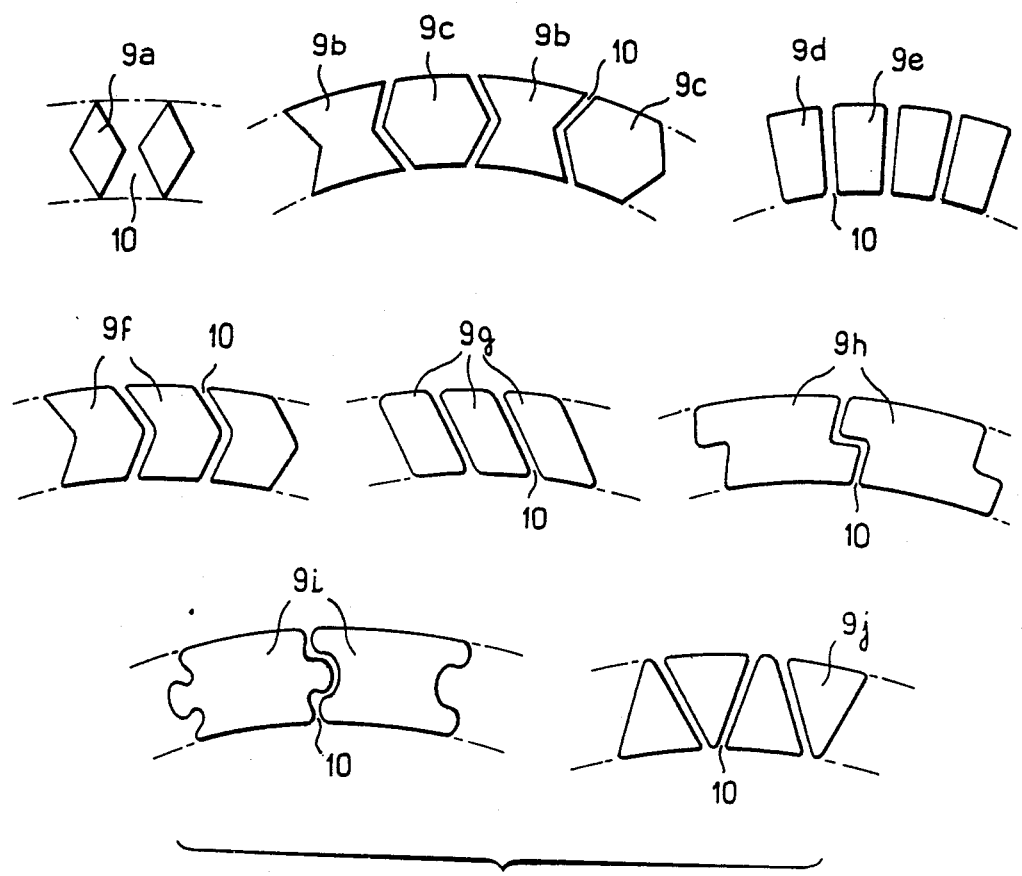
FIG_6

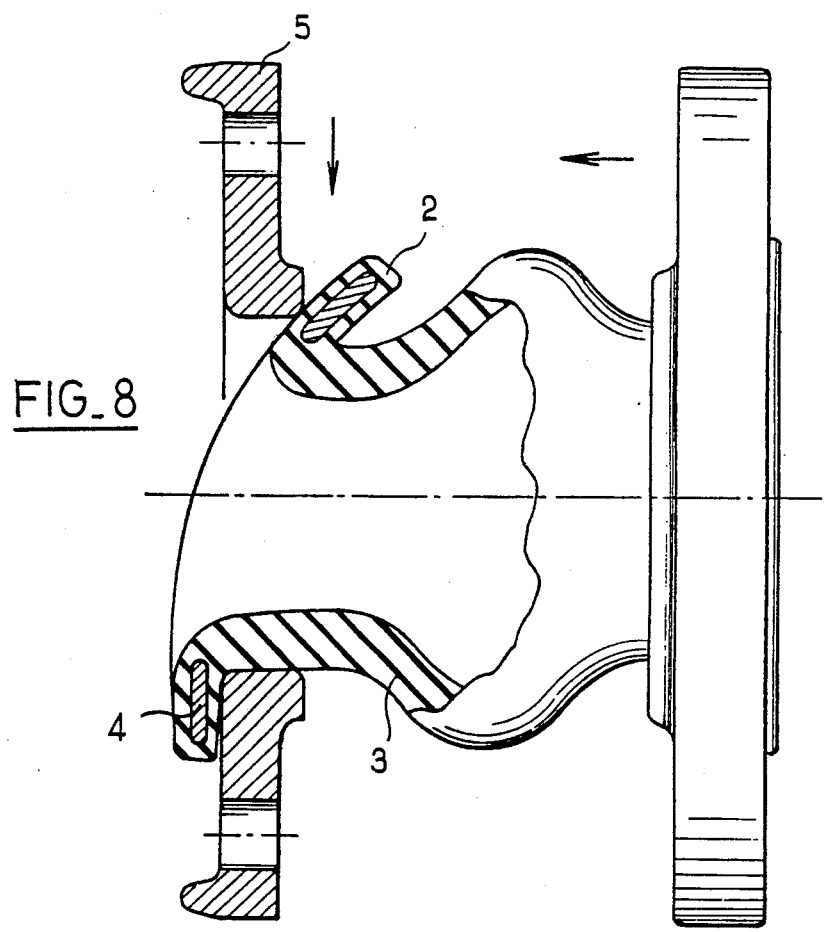
FIG_8
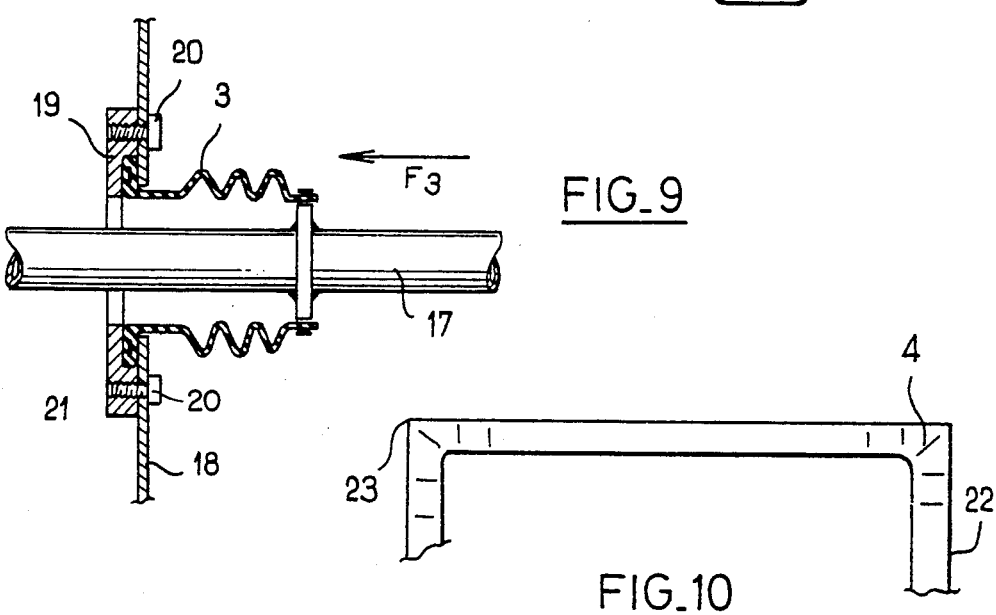
FIG_9
FIG_10

DEVICE FOR ANCHORING A FLEXIBLE TUBULAR SYSTEM ON A RIGID SHOULDER BY MEANS OF A FRAGMENTED ARMATURE

BACKGROUND OF THE INVENTION

The present invention relates to a system for anchoring traction elements of a flexible tubular structure to the opening in a rigid wall, with the anchoring being achieved by pressing axially on a shoulder or flange after passage through an opening provided in the rigid wall. In this description, to simplify the disclosure of the invention, the term "sleeve" will be used to define the flexible annular structure and the term "bead" will define the end of the sleeve which has a larger diameter than that of the sleeve and which abuts the rigid wall, hereinafter called "mating flange".

Sleeves with a flexible bead are known wherein the bead generally has an internal armature, i.e. embedded in the rubber, of annular form, composed of high-modulus rubber, a textile ply, a textile or metal strand, or a flexible spring. This type of reinforcement is adopted to render the bead deformable to permit mounting mating flanges after manufacture of the sleeve, by forcing the bead through the bore. The major drawback of these systems is the requirement of pinching of the flat flange between two planes, according to the device adopted, for example, by the Societe Kleber Industrie for its Dilatoflex NT expansion sleeves (technical dossier 79-BA1), or by the use of a form, obtained by machining, for a rigid part to abut a diameter inside this deformable bead, as for example in the air suspension diaphragms described in the French Pat. No. 72.02268 or in the expansion sleeves described in French Pat. Nos. 2 280 853, 2 033 789 or 2 006 730.

These sleeve systems with flexible beads thus require mounting techniques which often cause a strong stress concentration at the end of the mating flange, which can go as far as damaging or even destroying the sealing function. Hence, the usual sleeves with flexible beads can only be used for moderate service pressures. To overcome these drawbacks, solutions of rigid sleeves with large contact areas with the flange have been proposed in, for example, U.S. Pat. No. 2,998,986. This is in fact the solution adopted by Kleber Industrie for its built-in pipe flanges, the Endflex system described in the Performer AD10 pipe catalog, page 4 or in its Dilatoflex K expansion sleeves described in catalog FC175-18, June 1984.

All these device have high rigidity and are usually built with metal elements. Because of their design, rubber is compressed over a large contact surface area which improves stress distribution and reduces creep sensitivity, thus providing a better guarantee of tightness and the possibility of utilization at high service pressures.

However, due to their rigidity, these beads have the drawback of making it impossible to mount one-piece mating flanges after manufacture of the sleeve. Hence it is necessary to mount said mating flanges during production and to vulcanize the sleeve thus equipped with these metal parts, which considerably augments the weight and volume.

In addition, mating flanges are no longer demountable as shown by the Stenflex and General Rubber catalogs. Thus, the sleeve manufacturer must keep a large inventory on hand so that sleeves equipped with flanges conforming to the various standardized connections are available.

A sleeve with demountable flanges is described in French Pat. No. 2447512 but the beads are rigid and have reinforcing collars separate from the sleeve. The proposed solution, which consists of surrounding the collar by a U-shaped rubber form, required a very complex mold to be built.

As can be seen from the above analysis, a solution conforming to the state of the art which enables the requirements of anchoring quality (to withstand high service pressures or pulls), tightness of bonding, and ease of mounting on a flange or rigid shoulder to be met, is not known.

Hence, the object of the invention is to provide an anchoring device which offers the advantages of the two types of known beads without suffering their disadvantages. The anchoring is obtained by a bead having a large contact surface on the flange or shoulder, while offering flexibility allowing bending for passage of the bead through the bore.

Thus, the invention permits simpler manufacture of the sleeve by eliminating the weight and volume problems engendered by the necessity (in previously known solutions) of mounting the mating flanges during manufacture. Moreover, and this represents an essential saving—it considerably reduces the need to maintain a large parts inventory due to the various connections since the same range of sleeves can be equipped with the various types of commercial or customized mating flanges at the time of delivery. Management and marketing of the sleeves is thus greatly facilitated and delivery times are considerably reduced.

The invention consists of a radial device for anchoring flexible tubular structures such as rubber hoses, deformable collars, expansion joints, and suspension diaphragms in an opening in a rigid wall by abutting a shoulder or flange after passing through an opening or hole in said rigid wall, characterized by the flexible tubular structure, or sleeve, having at least one bead reinforced by a fragmented armature embedded in the rubber, composed of independent rigid elements to allow the bead to bend so it can slide into the bore of the rigid wall without altering, after a return to the plane shape, the radial rigidity which confers on the bead the necessary strength for its proper operation in service when it is compressed between the flange and the mating flange.

The essential element of the invention is comprised of the fragmented bead-reinforcing armature, formed of a metal or plastic hoop with high rigidity, composed of elements with varied geometric shapes, independent of each other.

At the time the sleeve is manufactured, it is necessary to position the elements of the fragmented armature in the mold and, such positioning operation may be accomplished in several ways such as, for example, by placing the individual elements in the mold itself or, in a premanufacturing phase, by disposing the element on a support comprising a layer of rubber-based mixture, with or without a textile base.

In all cases, a space, generally between 0.5 and 50% of the width of an element of the fragmented armature, will be left free between two adjacent elements for "rubber bridges" to be created, i.e. physical and chemical links between the rubber-based mixtures located in the mold above and below the fragmented armature in order to achieve the capability of radial mechanical bending of the bead upon mounting in the connecting mating flange.

At the time the sleeve is made, the fragmented armature can be placed in the bead either bare or wrapped in a ply of rubber mixture or of a fine textile material, the latter two possibilities having the advantage of protecting the carcass of the sleeve from damage when it contacts the edges of the fragmented armature.

The individual elements, whether or not they adhere to one another, embedded in the rubber, after vulcanization form an armature rendering the bead rigid, due to the high compression ridigity of the "rubber bridges" cited above.

However, these individual elements articulate with each other without damaging the reinforcing carcass of the sleeve and permit the bead to pass into the bore when the bead, which has become flexible is bent, whereby the bead re-opens on the shoulder naturally after the mating flanges have been put in place. The bead, wedged between the connecting flange and the mating flange or the shoulder, retains a radial rigidity equivalent to that of a bead with a one-piece armature by the self-pinching effect.

The fragmented armature is preferably made of a metal such as steel, aluminum, Zamak, or any other material (reinforced or composite plastic) whose tensile modulus is greater than 1500 MPa.

The number of individual elements of which the fragmented armature is composed is preferably between seven and thirteen, but it can be as great as the strength of the material and manufacturing economics permit.

The general shape of the individual elements is usually trapezoidal, but other possibilities may be considered such as rectangular, triangular, lozenge, or double trapezoidal shapes, cited as nonlimitative examples, which shapes would complicate the manufacturing of the fragmented armature elements but would not harm their operation. The separating zones between the individual elements are generally oriented radially but the reinforcement function is not harmed if the separating zones have a slight inclination, between 0° and 40°, with respect to a radius of the annular armature which crosses the separating zone.

The separating zones between the individual elements of the armature are rectilinear in the most frequent case but may have the shapes of arcs of circles, any curves, or chevrons.

The characteristics and variants of the invention will be better understood by reading the description hereinbelow with reference to the drawings, wherein:

BRIEF DESCRIPTION OF THE DRAWINGS

FIG. 1a is a cutaway view of the bead of an expansion sleeve having a conventional armature in FIG. 1a;

FIG. 1b is a cut away view of a bead of an expansion sleeve having a fragmented armature;

FIG. 2 shows the structure of a flexible sleeve having beads;

FIGS. 3, 4, and 5 represent various embodiments of the fragmented armature for reinforcement of the bead;

FIG. 6 illustrates the different shapes that the individual elements of the fragmented armature may have;

FIG. 8 shows schematically the mounting principle of the mating flanges;

FIGS. 9 and 10 show, as nonlimitative examples, some particular applications of the invention.

DETAILED DESCRIPTION

Figure 3:
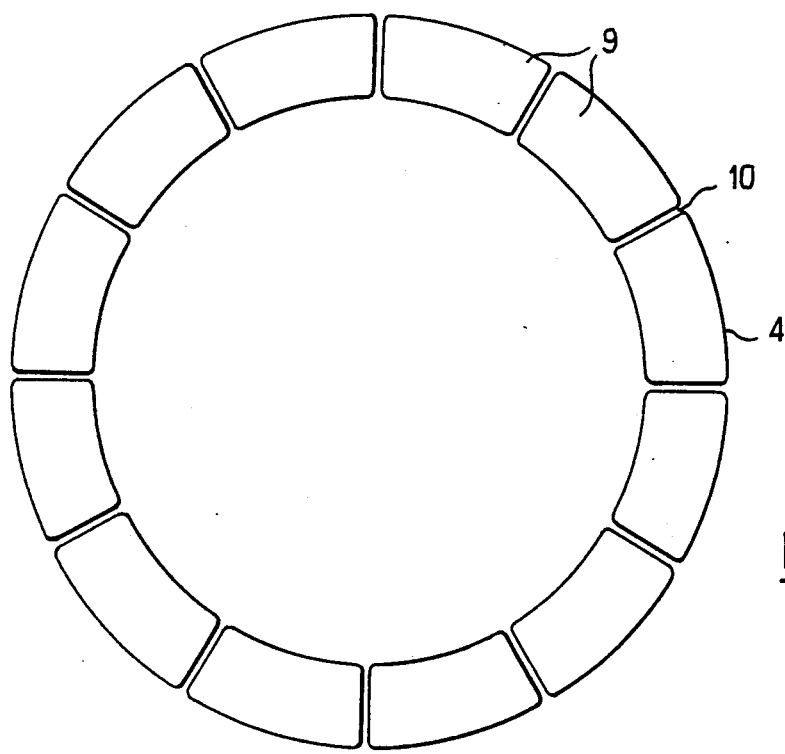

FIG. 1a shows the armature generally designated by the reference numeral (1) of bead (2) of a conventional expansion sleeve (3) with a rigid bead supplied with its mating flange (5) and FIG. 1b shows the fragmented armature generally designated by the reference numeral (4) of bead (2) constructed in accordance with the invention. The figure represents the part that would be obtained after elimination of the upper rubber layer of bead (2) thus stripped down to its armature (1) or (4) as the case may be.

FIG. 2 shows, in cross section, the structure of a sleeve (3) whose rubber body (6) is reinforced with a carcass of textile or metal plies (7) whose beads (2), which rest on the shoulder or mating flange (5), are reinforced by fragmented armatures (4). Here one may see how carcass (7) surrounds armature (4) in the vicinity of beads (2) at (8).

FIG. 2 also shows the force F which develops when the sleeve is pressurized, locking the individual elements of armature (4) against each other in a self-squeezing action without the individual elements being displaced. Force F1 is the tractive force exerted on textile or metal carcass (7) of sleeve (3). The resistance to the tractive force F1, or rigidity, is not affected by the absence of continuity of the armature, and the performance of sleeve (3) remains identical in service to that which would be obtained with a sleeve with beads reinforced by continuous rigid armatures.

In FIG. 3, representing the most usual configuration of the fragmented armature, the armature (4) is composed of twelve individual elements (9) of the same size, generally trapezoidal in shape, separated by zones (10) designed to form rubber bridges by means of the rubber-based mixtures which surround the armature, said zones being small in thickness by comparison to that of individual element (9).

Figure 4:
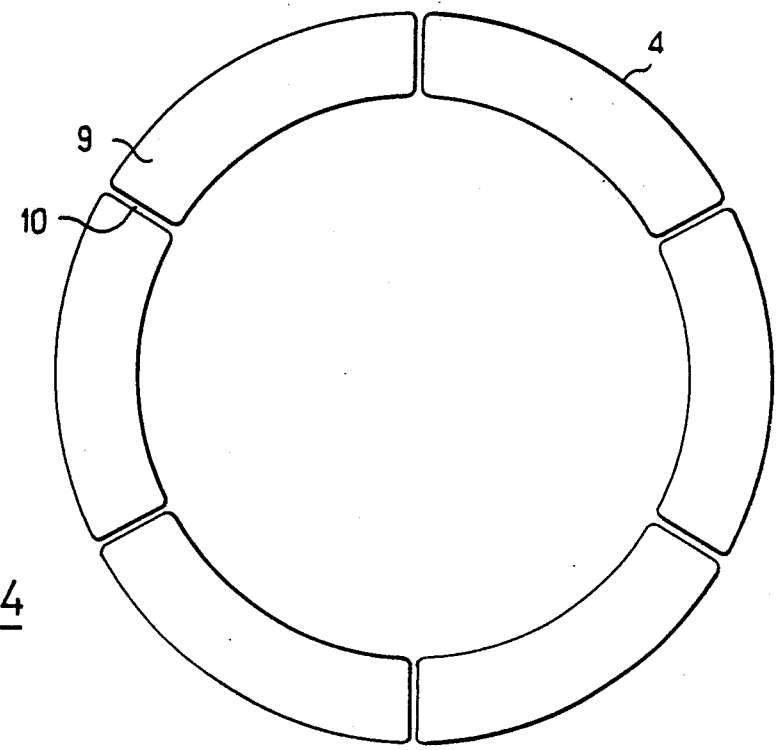

FIG. 4 shows another configuration of fragmented aramture (4) wherein the number of individual elements (9) is limited to six. In this embodiment, individual elements (9) are all of the same size. Separation zones (10) are still small in thickness by comparison with individual elements (9).

FIG. 5 illustrates an alternative embodiment of fragmented armature (4) wherein there are thirty-two individual elements (9), of a general trapezoidal shape, of different sizes and arranged alternately: one large element/one small element.

FIG. 6 shows, examples of some of the shapes individual elements (9) of fragmented armature (4) may have.

Thus, elements (9a) are lozenge-shaped and have between them a zone (10) with a large surface area for linking the rubber-based mixtures surrounding the fragmented armature. Elements (9b) and (9c) have a double-trapezoidal shape and are linked by the small bases in case (9b) and by the large bases in case (9c). Shapes (9b) and (9c) are generally used together and have a separation zone (10) with a small surface area between them. It would also be possible to combine only elements with shape (9b) or elements with shape (9c), which would increase the flexibility of the bead by increasing the surface area of the separation zone, allowing for rubber bridges to separate two neighboring elements. These configurations are not shown in the drawing.

Shapes (9d) and 9e) are substantially rectangular and can be separated by a zone (10) with the width desired for the flexibility of the bead.

Chevron shapes (9f) or more complex shapes such as (9h) and (9i) can be used in a quasi-interlocking structure or with a separation zone (10) of the desired width between two or more elements.

With the parallelepipedic shape (9g) it is possible to obtain, as with shapes (9b), (9c), (9h), (9i), and (9j), a greater pinching effect than with shapes (9a), (9d), and (9e) because of the very shape of the individual elements.

Triangular shapes (9j) lend themselves to mounting as shown in the drawing as an assembly (not shown) where all the vertices or all the bases of the triangular elements would be directed toward the center of the fragmented armature. The latter configuration leaves a wider separation zone (10) between two successive elements 9 and hence increases the flexibility of bead (2).

Figure 7A:
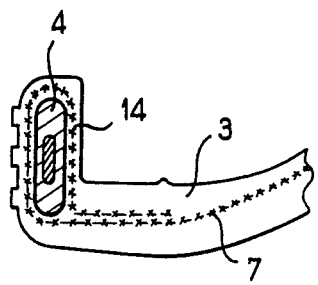
FIGS. 7a-7d show the possibility of manufacturing the armature of the bead.

FIG. 7a shows a possibility of protecting reinfocing carcass (7) of sleeve (3) by surrounding fragmented armature (4) with a protective ply (14) composed of a mixture based on rubber or a fine textile to protect the reinforcing carcass (7) from damage when in contact with the edges of individual elements (9) of fragmented armature (4). This structure is obtained during the pre-manufacturing phase of the sleeve's armature.

Figure 7B:
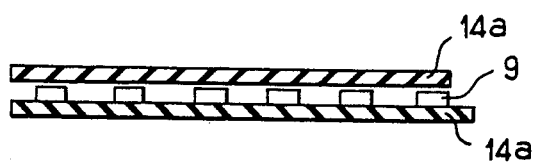
Figure 7C:
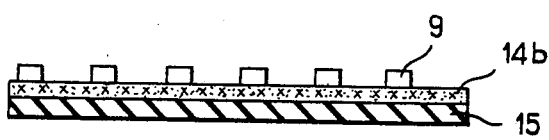
Figure 7D:
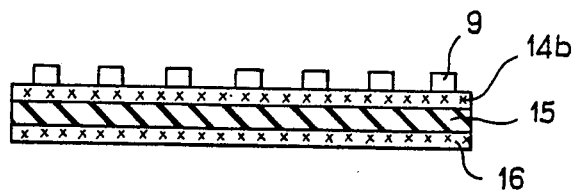

FIG. 7b shows such a method of pre-manufacturing the fragmented armature from the protective plies of rubber 14a while FIGS. 7c and 7d show schematically how protective textile ply (14b) is laid on a crude rubber sheet (15), serving as a support, either alone as in FIG. 7c or integral with a textile substrate (16) as in FIG. 7d.

FIG. 8 shows the mounting of mating flanges (5) on sleeve (3) by forced passage of bead (2), comprising fragmented aramture (4), which armature is composed of individual elements, through the bore of mating flange (5).

FIG. 9 illustrates an application of the invention to passage through a partition or wall (18) (for example that of a tank or rigid pipe) of a pipe, a rod, or a sheath (17) held by a sleeve (3) by a flange (19) fastened by bolts (20) when inner region of the partition or wall (21) cannot be reached. Arrow F3 indicates the mounting direction.

The above figures have usually been illustrated by the application to bodies of revolution, but the anchoring device proposed is not limited to this type of part; its operation would be just as satisfactory for mounting on parts with an oval or rectangular opening.

FIG. 10 gives a nonlimitative example of a rectangular opening such as a ventilation shaft (22) in which fragmented armature (4) would be inserted only into the angular zones (23) of the shaft.

The applications of the invention are not limited to the cases illustrated. Among other possibilities, it is advantageous to use the system described in the invention for anchoring ends, which are then overmolded with rubber, tension or prestress cables, or for anchoring in openings of any shape of flexible emergency evacuation devices in buildings.

As may be seen from the above description and illustrations, the proposed anchoring device allows easy mounting of a sleeve, a sheath, or any other flexible object of tubular shape on a rigid form, the only condition being that the object to be anchored be supplied with a bead whose armature, according to the invention, is fragmented.

In this way the invention avoids handling heavy and voluminous parts which complicate sleeve manufacturing molds or tools. It reduces the need to stock a wide variety of sleeves, each of which has standardized-connection mating flanges; it also decreases the areas necessary for storage since sleeves without mating flanges are less voluminous than those so equipped; it simplifies filling of orders by allowing different types of mating flanges to be mounted for a given diameter; hence, due to these advantages, it permits an appreciable gain in productivity and improves working conditions when sleeves are manufactured.

Finally, if a sleeve is damaged, the mating flanges can be removed and re-used on a replacement sleeve, which represents a non-negligible saving.

The individual skilled in the art can, of course, make various modifications to the device described above and its applications illustrated as nonlimitative examples without departing from the scope of the invention.

We claim:

1. Radial device for anchoring flexible tubular structures in an opening in a rigid wall by abutting a flange after passage through a bore made in said rigid wall, characterized by the fact that the flexible tubular structure has at least one bead reinforced by a fragmented armature embedded in rubber, composed of individual elements in order to enable the bead to be bent in an axial direction, allowing it to slide into the bore of the rigid wall without its radial rigidity being effected, thereby enabling a mounting of various types of mating flanges.

2. Anchoring device according to claim 1, characterized by said elements of said fragmented armature of said bead having the same geometry.

3. Anchoring device according to one of claims 1 or 2, characterized by a volume of zones separating individual elements of the fragmented armature being between 0.5 and 50% of a volume of one of said individual elements.

4. Anchoring device according to claim 1, characterized by zones separating individual elements of the fragmented armature forming an angle of less than 40° with a radius of said armature.

5. Anchoring device according to claim 1 characterized by the fragmented armature being composed of alternating individual elements with different geometric configuration.

6. Anchoring device according to claim 1 characterized by zones separating individual elements of the fragmented armature having complex geometrical shapes.

7. Anchoring device according to claim 1 characterized by the fragmented armature being composed of individual elements made of a metal or plastic having a tensile modulus equal to at least 1500 MPa.

8. Anchoring device according to claim 1, characterized by the number of elements of the fragmented armature which reinforces the bead being one of eight, twelve, sixteen, and twenty-four.

9. Expansion sleeve characterized by at least one of the beads having an anchoring device according to claim 1.

10. Flexible hose including integral flanges, characterized by at least one bead thereof having an anchoring device according to claim 1.

11. Air suspension diaphragm characterized by the at least one bead having an anchoring device according to claim 1.

* * * * *